(12) United States Patent
Hoshuyama

(10) Patent No.: US 7,656,458 B2
(45) Date of Patent: Feb. 2, 2010

(54) COLOR PHOTOGRAPHING DEVICE

(75) Inventor: Hideo Hoshuyama, Kawasaki (JP)

(73) Assignee: Nikon Corporation, Tokyo (JP)

( * ) Notice: Subject to any disclaimer, the term of this patent is extended or adjusted under 35 U.S.C. 154(b) by 884 days.

(21) Appl. No.: 10/876,566

(22) Filed: Jun. 28, 2004

(65) Prior Publication Data

US 2005/0001912 A1 Jan. 6, 2005

(30) Foreign Application Priority Data

Jul. 2, 2003 (JP) ............................ 2003-190381

(51) Int. Cl.
*H04N 5/238* (2006.01)

(52) U.S. Cl. .................. 348/366; 348/223.1; 348/224.1; 348/229.1; 348/273; 348/342; 348/364

(58) Field of Classification Search ............ 348/207.99, 348/216.1, 217.1, 222.1, 223.1, 224.1, 229.1, 348/266, 267, 268, 272, 273, 289, 290, 342, 348/360, 361, 362, 363, 364, 366; 356/416, 356/419, 425; 359/891
See application file for complete search history.

(56) References Cited

U.S. PATENT DOCUMENTS

| | | | |
|---|---|---|---|
| 4,688,085 A | | 8/1987 | Imaide |
| 4,774,564 A * | | 9/1988 | Konishi .................... 348/224.1 |
| 5,398,058 A | | 3/1995 | Hattori |
| 5,481,302 A * | | 1/1996 | Yamamoto et al. ........ 348/223.1 |
| 5,555,464 A * | | 9/1996 | Hatlestad .................... 348/266 |
| 5,592,223 A * | | 1/1997 | Takamura et al. ............ 348/309 |
| 6,727,942 B1 | | 4/2004 | Miyano |
| 6,952,225 B1 * | | 10/2005 | Hyodo et al. ............. 348/223.1 |
| 7,030,916 B2 * | | 4/2006 | Aotsuka ...................... 348/272 |
| 7,038,722 B2 * | | 5/2006 | Kitagishi .................... 348/272 |
| 7,098,945 B1 * | | 8/2006 | Sasai et al. ................ 348/223.1 |
| 7,148,925 B2 * | | 12/2006 | Osada et al. ................. 348/275 |
| 7,304,668 B2 * | | 12/2007 | Ichikawa et al. .......... 348/223.1 |
| 7,365,910 B2 * | | 4/2008 | Ishii et al. .................... 359/676 |
| 2001/0013898 A1 | | 8/2001 | Bawolek et al. |
| 2004/0109068 A1 | | 6/2004 | Mitsunaga et al. |
| 2008/0036903 A1 * | | 2/2008 | Hayakawa .................. 348/361 |

FOREIGN PATENT DOCUMENTS

| EP | 1 357 760 A1 | 10/2003 |
|---|---|---|
| JP | A 55-165084 | 12/1980 |

(Continued)

*Primary Examiner*—Tuan Ho
*Assistant Examiner*—Chriss S Yoder, III
(74) *Attorney, Agent, or Firm*—Oliff & Berridge, PLC

(57) ABSTRACT

A color photographing device is equipped with a light-receiving section having a red pixel selectively receiving red light and outputting a red pixel signal and a green pixel selectively receiving green light and outputting a green pixel signal. The color photographing device is further equipped with an optical filter disposed on the side with a light-receiving surface of the light-receiving section. The optical filter substantially equalizes the signal level of the red pixel signal and the signal level of the green pixel signal when achromatic color illuminated by a solar light source in the daytime is photographed. Therefore, a white balance gain Wr at about 5000K can be lowered as compared with a conventional color photographing device. Accordingly, reduction of color noises and enhancement of gradation can be expected.

4 Claims, 6 Drawing Sheets

FOREIGN PATENT DOCUMENTS

| | | |
|---|---|---|
| JP | U-59-0009678 | 1/1984 |
| JP | A 7-193826 | 7/1995 |
| JP | A 2000-92509 | 3/2000 |
| JP | A-2004-096633 | 3/2004 |
| WO | WO 99/67944 A1 | 12/1999 |
| WO | WO 02/056604 A1 | 7/2002 |

* cited by examiner (a)

(b)

(c)

(d)

COLOR PHOTOGRAPHING DEVICE

CROSS REFERENCE TO RELATED APPLICATION

This application is based upon and claims the benefit of priority from Japanese Patent Application No. 2003-190381, filed on Jul. 2, 2003, the entire contents of which are incorporated herein by reference.

BACKGROUND OF THE INVENTION

1. Field of the Invention

The present invention relates to a color photographing device such as an electronic camera, a digital video camera or the like. Specifically, the present invention relates to a white balance adjustment carried out by a color photographing device.

2. Description of the Related Art

In general, color temperature of a light source for illuminating an object is different among photographing places. Colors reproduced as an image reflect colors of the object itself and colors of the light source for illuminating the object. Therefore, white balance is adjusted in the color photographing device so that a white object is reproduced to be white (for example, see Japanese Unexamined Patent Publication No. 2000-92509 and Japanese Unexamined Patent Publication No. Hei 7-193826).

For example, in a color photographing device in which a red pixel signal R, a green pixel signal G and a blue pixel signal B are output by an image sensor, white balance is adjusted so that the signal levels of R, G and B are equal to one another when achromatic color is photographed. Specifically, the color temperature of a light source is first estimated. Then, R and B are multiplied by gains Wr and Wb, respectively, for white balance processing (hereinafter referred to as "white balance gains") which correspond to the color temperature.

FIG. 1 shows an example of a spectral sensitivity characteristic of a conventional image sensor, which is normalized on the basis of the peak value of the sensitivity of green pixels, and FIG. 2 shows a white balance gain characteristic to the image sensor having the spectral sensitivity characteristic shown in FIG. 1. As is apparent from FIG. 2, the conventional image sensor has a spectral sensitivity characteristic that the ratio of the signal levels of R, G and B are equal to about 0.45:1:0.55 when achromatic color illuminated by a light source having color temperature of 5000K is photographed. The following two reasons can be given as a part of the reasons that the spectral sensitivity characteristic of the image sensor has been set as described above.

First, G contains a larger mount of brightness information than R or B. Therefore, when the signal level of G is varied, the brightness of an overall image is varied.

Accordingly, when white balance is adjusted, the white balance gain Wg to G must be set to 1.

Second, the white balance gains Wr and Wb are normally required to be equal to 1 or more. This is because if there is any color temperature at which the white balance gains Wr and Wb are set at less than 1, the highlight becomes colored at the color temperature.

More specifically, if Wr, Wb>1, pixel signals R, G, and B are held saturated, and thus the highlight remains white. However, if white balance is adjusted with Wr being smaller than 1, G and B remain at their maximum values, but R is set to be smaller than the maximum value thereof. Accordingly, the white of the highlight is reproduced to be slightly blue-green.

In the conventional color photographing device, as shown in FIG. 2, about double the white balance gain was applied to both Wr and Wb when color temperature was around 5000K (color temperature at which photographing is considered to be most frequently carried out). However, the higher the Wr and Wb are, the more remarkable the troubles are, such as increased noises of R and B and discontinuity of gradation. Particularly, color noises can be remarkable at dark portions of an image.

SUMMARY OF THE INVENTION

A first object of the present invention is to provide a technique which can reduce noises of R and B in a color photographing device.

A second object of the present invention is to broaden the follow-up range of white balance in a photographing device for which the first object is achieved. Here, the follow-up range means a range of color temperatures in which all of the white balance gains Wr, Wg, Wb are equal to 1 or more.

A color photographing device according to the present invention is equipped with a light-receiving section and an optical filter disposed on the side with a light-receiving surface of the light-receiving section. The light-receiving section has a "red pixel selectively receiving red light and outputting a red pixel signal corresponding to the light amount received" and a "green pixel selectively receiving green light and outputting a green pixel signal corresponding to the light amount received". The optical filter functions to substantially equalize the signal level of a red pixel signal and the signal level of a green pixel signal with each other when achromatic color illuminated by a solar light source in the daytime is photographed. The light-receiving section is, for example an image sensor.

The color photographing device of this invention is preferably configured as follows.

First, the light-receiving section has a blue pixel selectively receiving blue light and outputting a blue pixel signal corresponding to the light amount received. Secondly, the optical filter substantially equalizes the signal level of a red pixel signal, the signal level of a green pixel signal, and the signal level of a blue pixel signal with one another when achromatic color illuminated by a solar light source in the daytime is photographed.

Alternatively, the color photographing device of the present invention is preferably configured as follows. First, the optical filter has an infrared light cut-off filter. Secondly, the infrared light cut-off filter has a transmissivity of 45% or more at the wavelength of 650 nm and a transmissivity of 5% or less at the wavelength of 700 nm.

The above configuration is associated with the first object.

In order to attain the second object, the color photographing device of the present invention should be equipped with a white balance adjusting section and an exposure adjusting section described below. The white balance adjusting section estimates the color temperature of a photography light source and adjusts the white balance of the signals output from the light-receiving section in conformity with the estimated color temperature.

In a case where the signal level of the green pixel signal is expected to be lower than the signal level of any one of the other pixel signals when achromatic color illuminated by the photography light source is photographed, the exposure adjusting section reduces the amount of exposure at the light-receiving section.

A more preferable mode to attain the second object is as follows. That is, the white balance adjusting section amplifies the green pixel signal in accordance with the amount of exposure reduced by the exposure adjusting section to thereby compensate for the reduced amount of exposure.

The white balance adjusting section indicates, for example, a white balance adjusting unit, a colorimetry unit and a function of an MPU for setting the white balance adjusting unit to any one of plural white balance modes in accordance with the color temperature Tc.

The exposure adjusting section corresponds to a function of an MPU for reducing an image-surface exposure amount when Tc≧6600K and when Tc≦4200K. Tc represents the color temperature of the photography light source.

"To compensate for the reduced amount of the exposure amount" means "to adjust the white balance of an image data by using a white balance gain larger than 1".

BRIEF DESCRIPTION FO THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED
EMBODIMENTS

Preferred embodiments according to the present invention will be described hereunder with reference to the accompanying drawings.

Configuration of Embodiment

Figure 3:
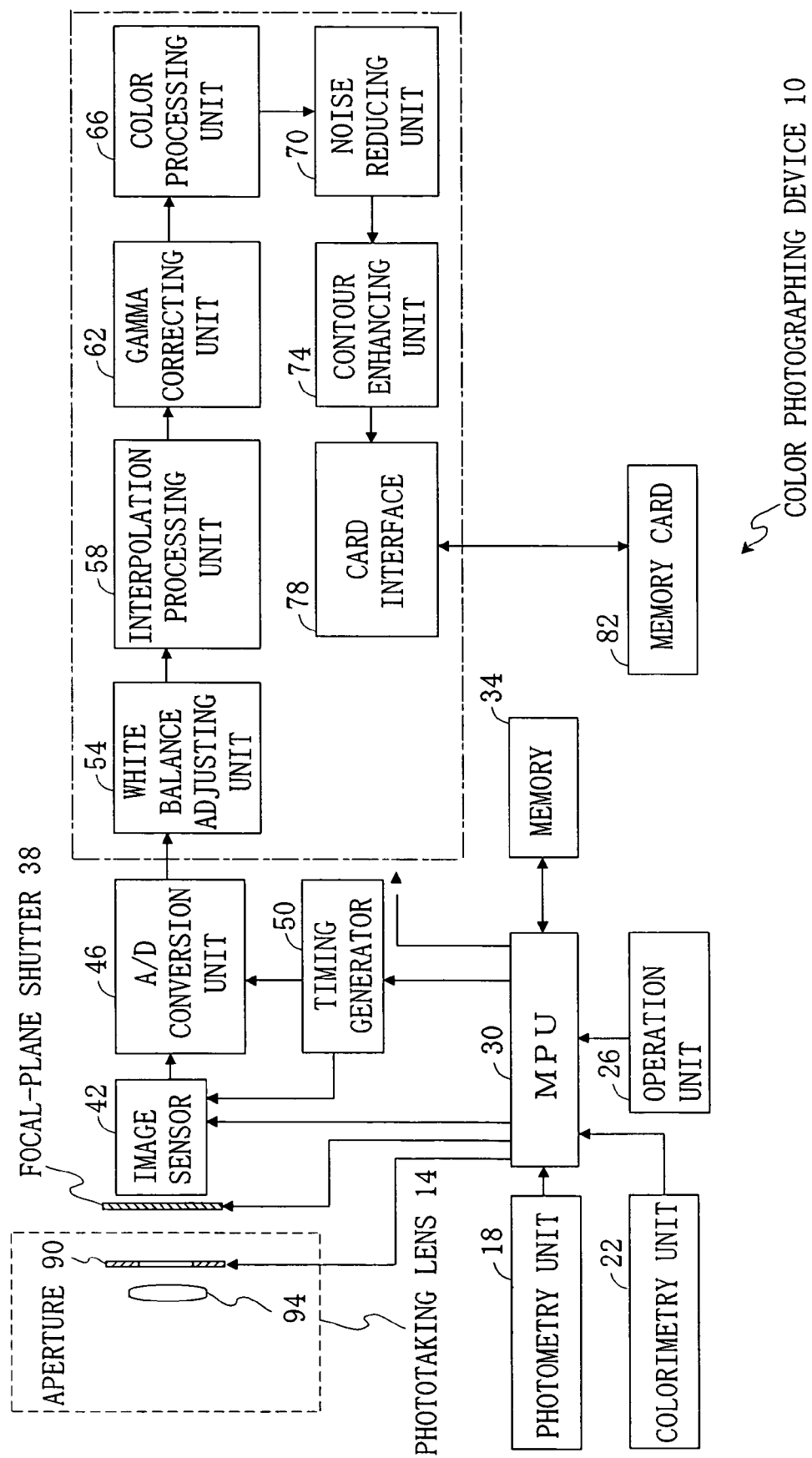
FIG. 3 is a block diagram showing the configuration of a color photographing device of the present invention.

FIG. 3 is a block diagram showing the configuration of a color photographing device according to an embodiment. As shown in FIG. 3, the color photographing device 10 comprises an exchangeable phototaking lens 14, a photometry unit 18, a colorimetry unit 22, an operation unit 26, an MPU 30, a memory 34, a focal plane shutter 38, an image sensor 42, an analog-to-digital conversion unit 46, a timing generator 50, a white balance adjusting unit 54, an interpolation processing unit 58, a gamma correcting unit 62, a color processing unit 66, a noise reducing unit 70, a contour enhancing unit 74, a card interface 78 and an exchangeable memory card 82. In this embodiment, for example, the color photographing device 10 is configured as an electronic camera.

The phototaking lens 14 is configured by an aperture 90 and a lens group 94.

The operation unit 26 has a setting button group containing a power source button, a photographing mode selecting button, a photographing condition inputting button, a manual white balance mode selecting button, a color temperature inputting button, etc., and a release button for instructing start of photography (not shown).

The MPU 30 carries out system control of the color photographing device 10 by using the memory 34 (and also controls each of parts surrounded by a chain line of FIG. 3).

The image sensor 42 has plural red pixels, green pixels and blue pixels for outputting pixel signals corresponding to the amount of light received. These red, green and blue pixels are arranged in a two-dimensional matrix form. Each red pixel selectively receives red light and outputs a red pixel signal R. Each green pixel selectively receives green light and outputs a green pixel signal G. Each blue pixel selectively receives blue light and outputs a blue pixel signal B.

Figure 4:
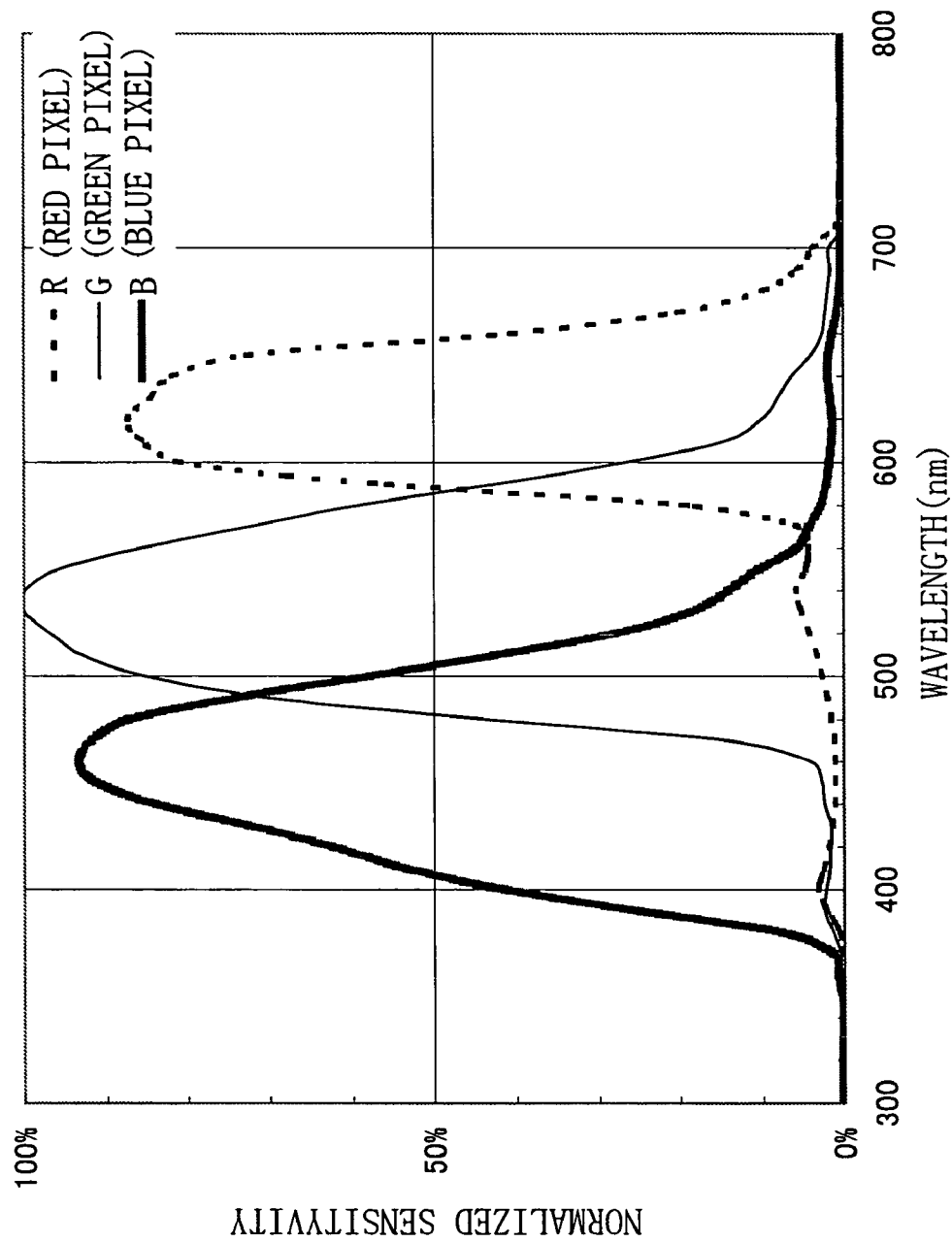
FIG. 4 is a diagram showing an example of a spectral sensitivity characteristic of an image sensor according to the present invention which is normalized on the basis of the peak value of the sensitivity of green pixels.

FIG. 4 shows a spectral sensitivity characteristic of the image sensor 42 which is normalized on the basis of the peak value of the sensitivity of the green pixels. As is apparent from a comparison between FIG. 4 and FIG. 1, the spectral sensitivities of the red and blue pixels in the image sensor 42 of this embodiment are higher than those in the conventional image sensor. The spectral sensitivity means the area of FIG. 4, that is, a value achieved by integrating the sensitivity with wavelengths.

In order to achieve a spectral sensitivity characteristic of the red pixels as shown in FIG. 4, this embodiment uses, for example, an optical thin film filter to increase the peak of the spectral sensitivity of the red pixels in place of the infrared light cut-off filter in the conventional image sensor. The optical thin film filter of this embodiment is required to have a sharp infrared light cut-off characteristic. For example, it is preferable that the optical thin film filter has transmissivity of about 45% or more at a wavelength of 650 nm and transmissivity of about 5% or less at a wavelength of 700 nm.

Furthermore, in order to attain a spectral sensitivity characteristic of blue pixels as shown in FIG. 4, in this embodiment, the thickness of a thin film filter which is formed on each blue pixel to selectively pass blue light is set to be smaller than that of the conventional image sensor. Accordingly, the spectral sensitivity of the blue pixels is higher than that of the conventional image sensor. The spectral sensitivity of the blue pixels may be enhanced by reducing the concentration of pigment in the thin film filter without varying the thickness of the thin film filter. Alternatively, the spectral sensitivity of the blue pixels may be enhanced by varying the characteristic of an ultraviolet light cut-off filter in the conventional image sensor.

The spectral sensitivities of the red, green and blue pixels may be approached to one another not by enhancing the spectral sensitivities of the red and blue pixels, but by using an optical thin film filter having low transmissivity on green pixels to reduce the peak of the green pixels, for example. In this case, sensitivity is lowered, and thus it is preferable that the spectral sensitivities of the red and blue pixels are enhanced as in the case of this embodiment.

As another method to achieve a spectral sensitivity characteristic as shown in FIG. 4, an adjustment may be made on the basis of the ratio of light-receiving areas of photodiodes in the red, green and blue pixels.

Description of Operation of Embodiment

Figure 5:
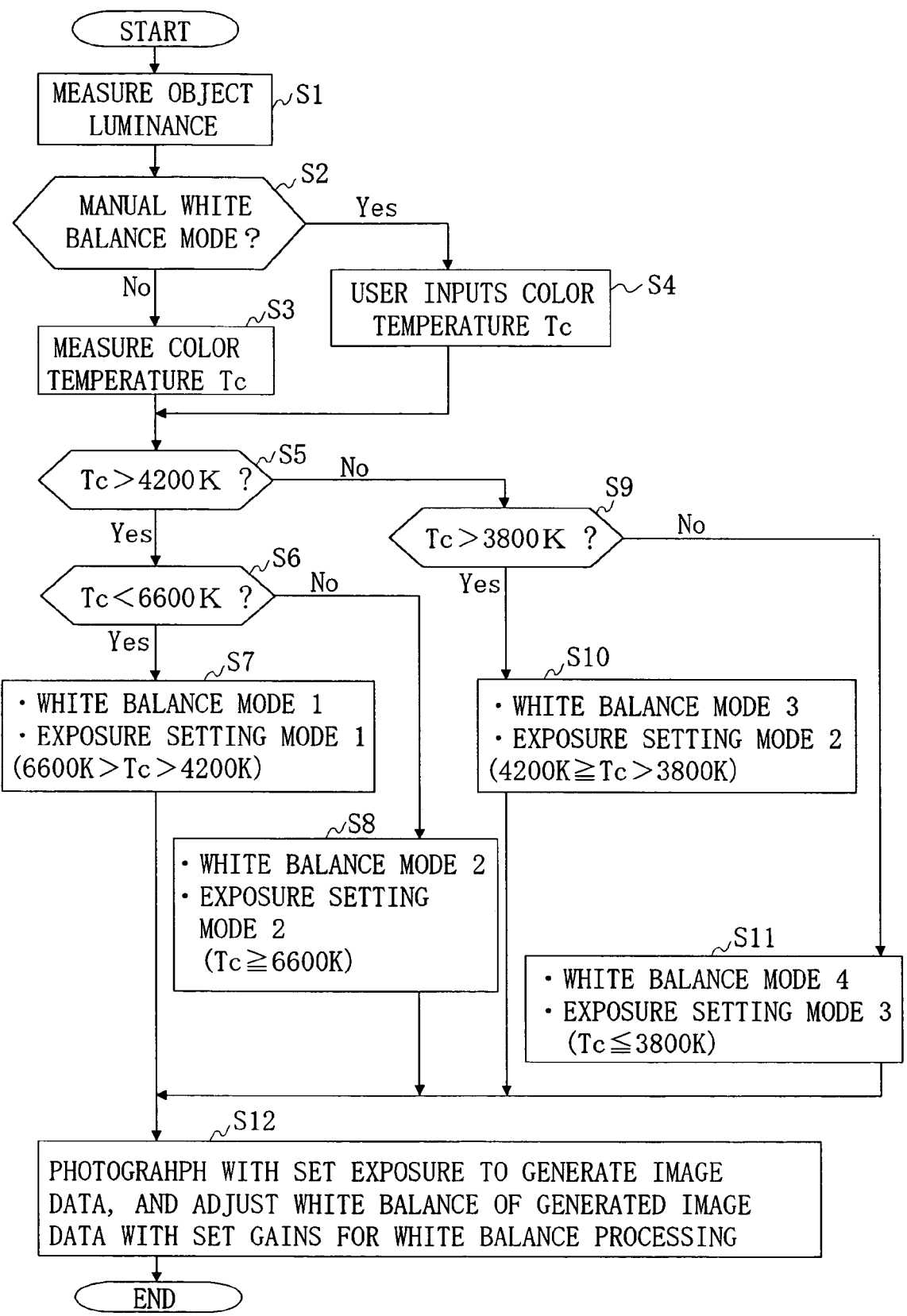
FIG. 5 is a flowchart showing the operation of the color photographing device of the present invention.

FIG. 5 is a flowchart showing the operation of the color photographing device 10. The photographing operation of the color photographing device 10 will be described below according to step numbers shown in FIG. 5.

[Step S1]

The photometry unit 18 measures object luminance by a photometric sensor (not shown), and transmits the object luminance thus measured to the MPU 30. The MPU 30 determines a proper exposure value on the basis of preset sensitivity (ISO speed ratings Equivalency) of the image sensor 42. The proper exposure value means a range of an exposure value in which an object is clearly reproduced as an image. In this embodiment, the proper exposure value is handled as an image-surface exposure amount Ex [lux·second] to the light-receiving surface of the image sensor 42. The MPU 30 determines f-number and exposure time on the basis of the image-surface exposure amount Ex. This determining step also reflects a photographing condition set by a user.

[Step S2]

The MPU 30 judges whether the color photographing device is set to a manual white balance mode or not. If it is set to the manual white balance mode, the processing goes to step S4. On the other hand, if it is not set to the manual white balance mode, the processing goes to step S3.

[Step S3]

The colorimetry unit 22 estimates the color temperature of the light source (photography light source) illuminating an object with a calorimetric sensor (not shown) as Tc, and transmits Tc to the MPU 30.

[Step S4]

A user operates buttons of the operation unit 26 to input the color temperature Tc.

[Step S5]

In the following steps S5 to S11, the MPU 30 sets the white balance adjusting unit 54 to any one of the white balance modes 1 to 4 in accordance with the estimated or input color temperature Tc.

Figure 2:
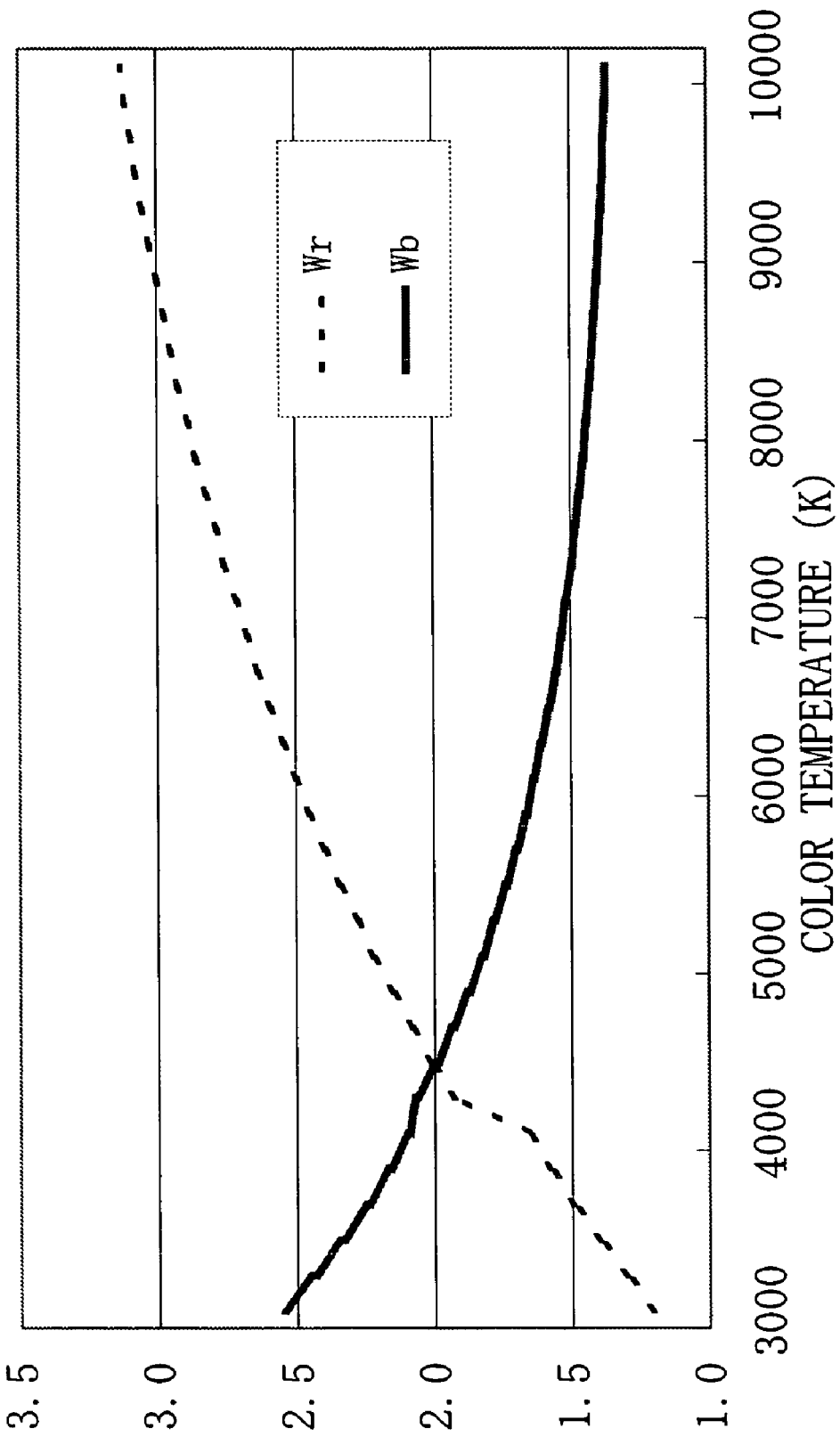
FIG. 2 is a diagram showing a white balance gain characteristic to an image sensor having a spectral sensitivity characteristic shown in FIG. 1.
Figure 6:
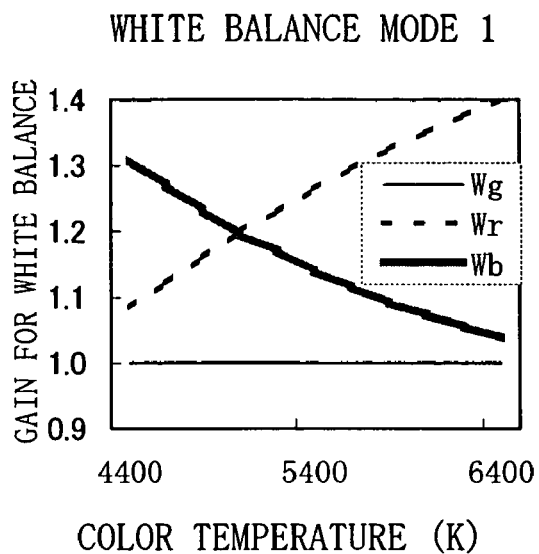
FIG. 6 is a diagram showing a white balance gain characteristic in each white balance mode of the present invention.
Figure 6:
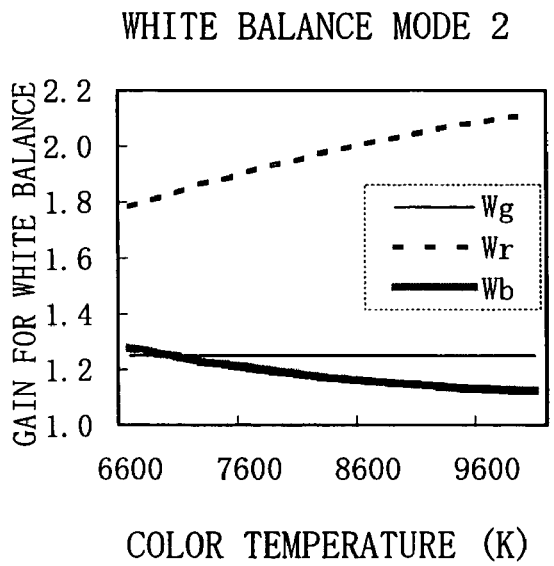
Figure 6:
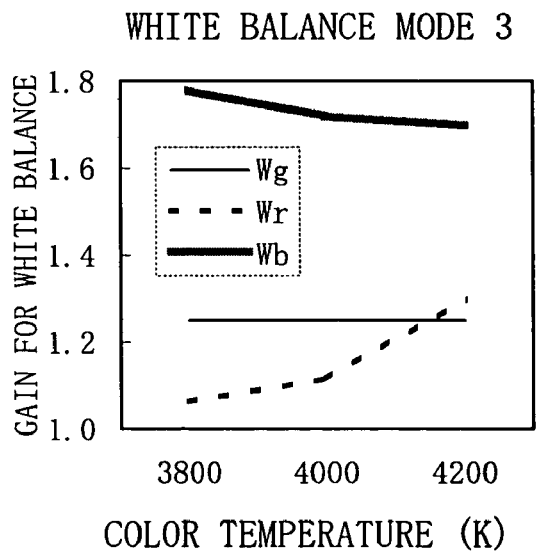
Figure 6:
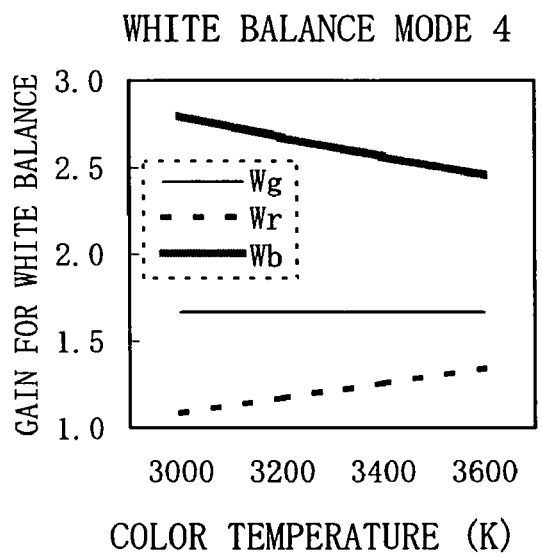

FIG. 6 shows white balance gains Wr, Wg and Wb in each of the white balance modes 1 to 4. The white balance gains Wr, Wg and Wb shown in FIG. 6 properly adjust the white balance of the red pixel signal R, the green pixel signal G and the blue pixel signal B output from the image sensor 42 having the spectral sensitivity characteristic shown in FIG. 4 (so that the signal levels of R, G and B under achromatic photography are equal to one another). As is apparent from a comparison with FIG. 2, the white balance gain characteristic of this embodiment is greatly different from the conventional color photographing device in the following two points.

Firstly, the white balance gains Wr and Wb are smaller than those of the conventional color photographing device.

Secondly, the green pixel signal is multiplied by a white balance gain Wg larger than 1 in accordance with the color temperature Tc.

The MPU 30 operates in any one of the exposure setting modes 1 to 3 in accordance with the color temperature Tc to correct the image-surface exposure amount Ex determined in step S1. This is because when the white balance gain Wg is set to be larger than 1, the sensitivity is enhanced (the brightness of the overall image is enhanced), so the increment of the sensitivity needs to be offset. This is due to the fact that the green pixel signal G contains a larger amount of luminance information than the red pixel signal R or blue pixel signal B.

Therefore, the MPU 30 first judges whether the color temperature Tc is higher than 4200K or not. If the color temperature Tc is higher than 4200K, the processing goes to step S6. On the other hand, if the color temperature Tc is not higher than 4200K, the processing goes to step S9.

[Step S6]

The MPU 30 judges whether the color temperature Tc is lower than 6600 Kb or not.

If the color temperature Tc is lower than 6600K, the processing goes to step S7. On the other hand, if the color temperature Tc is not lower than 6600K, the processing goes to step S8.

[Step S7]

The color temperature Tc when the processing reaches this step satisfies "6600K>Tc>4200K". In this color temperature range, the MPU 30 sets the white balance adjusting unit 54 to the white balance mode 1, and also operates in an exposure setting mode 1. In the exposure setting mode 1, the MPU 30 carries out no correction to the image-surface exposure amount Ex [lux·second] determined in step S1, and controls the respective parts so that the photography is carried out under the photographing condition determined in step S1.

More specifically, as shown in FIG. 6(a), the white balance gain Wg is set to 1 irrespective of the color temperature in the white balance mode 1, and thus the sensitivity is little varied. Accordingly, it is unnecessary to correct the image-surface exposure amount Ex determined in step S1.

[Step S8]

The color temperature Tc when the processing reaches this step satisfies Tc≧6600K. In this color temperature range, the MPU 30 sets the white balance adjusting unit 54 to the white balance mode 2, and also operates in an exposure setting mode 2. In the exposure setting mode 2, the MPU 30 multiplies the image-surface exposure amount Ex [lux·second] determined in step S1 by a correction coefficient Kd to reduce the exposure amount. Thereby an image-surface exposure amount Ex' after the correction is calculated as in the following equation.

$$Ex' = Ex \times Kd \tag{1}$$

In the exposure setting mode 2, Kd=0.8. The MPU 30 corrects the photographing condition so as to give the image-surface exposure amount Ex'. This can be achieved by increasing an aperture value to reduce a transmitted light amount of the phototaking lens 14, by shortening an exposure time, or the like. The MPU 30 controls the respective parts so that photographing is carried out under the corrected photographing condition.

More specifically, as shown in FIG. 6(b), the white balance gain Wg is set to 1.25 in the white balance mode 2, and thus the sensitivity is enhanced. Accordingly, it is required to reduce the image-surface exposure amount Ex determined in step S1 so that the increment of the sensitivity is offset.

[Step S9]

The MPU 30 judges whether the color temperature Tc is higher than 3800K or not.

If the color temperature Tc is higher than 3800K, the processing goes to step S10. If the color temperature Tc is not higher than 3800K, the processing goes to step S11.

[Step S10]

The color temperature Tc when the processing reaches this step satisfies 4200K≧Tc>3800K. In this color temperature range, the MPU 30 sets the white balance adjusting unit 54 to a white balance mode 3. As shown in FIG. 6(c), the white balance gain Wg is set to 1.25 in the white balance mode 3 as in the case of the white balance mode 2. Therefore, the MPU 30 operates in the exposure setting mode 2 as in the case of the step S8.

[Step S11]

The color temperature Tc when the processing reaches this step satisfies Tc≦3800K. In this color temperature range, the MPU 30 sets the white balance adjusting unit 54 to a white balance mode 4, and operates in an exposure setting mode 3. In the exposure setting mode 3, the MPU 30 corrects the image-surface exposure amount Ex determined in step S1 to Ex' by setting the correction coefficient Kd of the equation (1) to 0.6. The MPU 30 corrects the photographing condition so as to give the image-surface exposure amount Ex', and controls the respective parts so that photographing is carried out under the corrected photographing condition.

More specifically, as shown in FIG. 6(d), the white balance gain Wg is set to 1.67 in a white balance mode 4. Accordingly, the image-surface exposure amount Ex determined previously is reduced so as to offset the increment of the sensitivity.

[Step S12]

Photographing is carried out under the photographing condition set in any one of the steps S7, S8, S10 and S11, and the image sensor 42 outputs the red pixel signal R, the green pixel signal G and the blue pixel signal B. The analog-to-digital conversion unit 46 subjects the output signal of the image sensor 42 to clamp processing, A/D conversion, etc. to generate digital image data. The white balance adjusting unit 54 multiplies the red pixel signal R, the green pixel signal G and the blue pixel signal B of the image data by the white balance gains Wr, Wg, and Wb, respectively, on the basis of the set white balance mode.

Thereafter, the image data is subjected to color interpolation processing, gamma correction processing, and then input to a color processing unit 66. The color processing unit 66 multiplies the image data in which each pixel has pixel signals of R, G and B by a matrix coefficient, whereby the image data are converted to image data in which each pixel is represented by pixel signals of Y, Cb, and Cr. The matrix coefficient contains a component to enhance color reproduction.

Thereafter, the image data are subjected to noise reduction processing, contour enhancing processing, etc. and then recorded through the card interface 78 on the memory card 82.

The above describes the operation of the color photographing device 10 of this embodiment.

Effect of the Embodiment

In this embodiment, the image sensor 42 including the red and blue pixels which are higher in spectral sensitivity than those of the conventional image sensor. Therefore, the white balance gains Wr and Wb can be reduced than in the conventional color photographing device at about 5000K (the color temperature at which photographing is expected to be most frequently carried out). Accordingly, reduction of noises and enhancement of gradation can be achieved.

The white balance gain Wg is set to be larger than 1 at a color temperature (about 4000K or less) at which the red pixel signal under achromatic color photographing is larger than the green pixel signal G (steps S10, S11). Accordingly, Wr is kept at 1 or more even in the range from about 3000K to 4000K, and thus white balance can be adjusted. At this time, the increment of the sensitivity which is caused by setting Wg to a value larger than 1 is offset by reduction of the exposure amount, so the exposure amount and the luminance of the overall image can be kept in a proper range.

Likewise, Wg is set to be larger than 1 at a color temperature (about 7000K or more) at which the blue pixel signal B under achromatic color photographing is larger than the green pixel signal G (step S8). Accordingly, Wb is kept at 1 or more even in the range from about 7000K to 10000K, and thus white balance can be adjusted. Even in this case, the increment of the sensitivity which is caused by setting Wg to a value larger than 1 is offset by reduction of the exposure amount, so the exposure amount can be kept in a proper range.

As a result, the noise reduction and the enhancement of gradation can be performed by reducing Wr and Wb, on condition that the range of a general light source (an electric lamp of 3000K to shade of 10000K) is included in a follow-up range and that the exposure amount is kept in the proper range. In this follow-up range, Wr and Wb are not less than 1, and thus there occurs no problem that highlight is colored.

Figure 1:
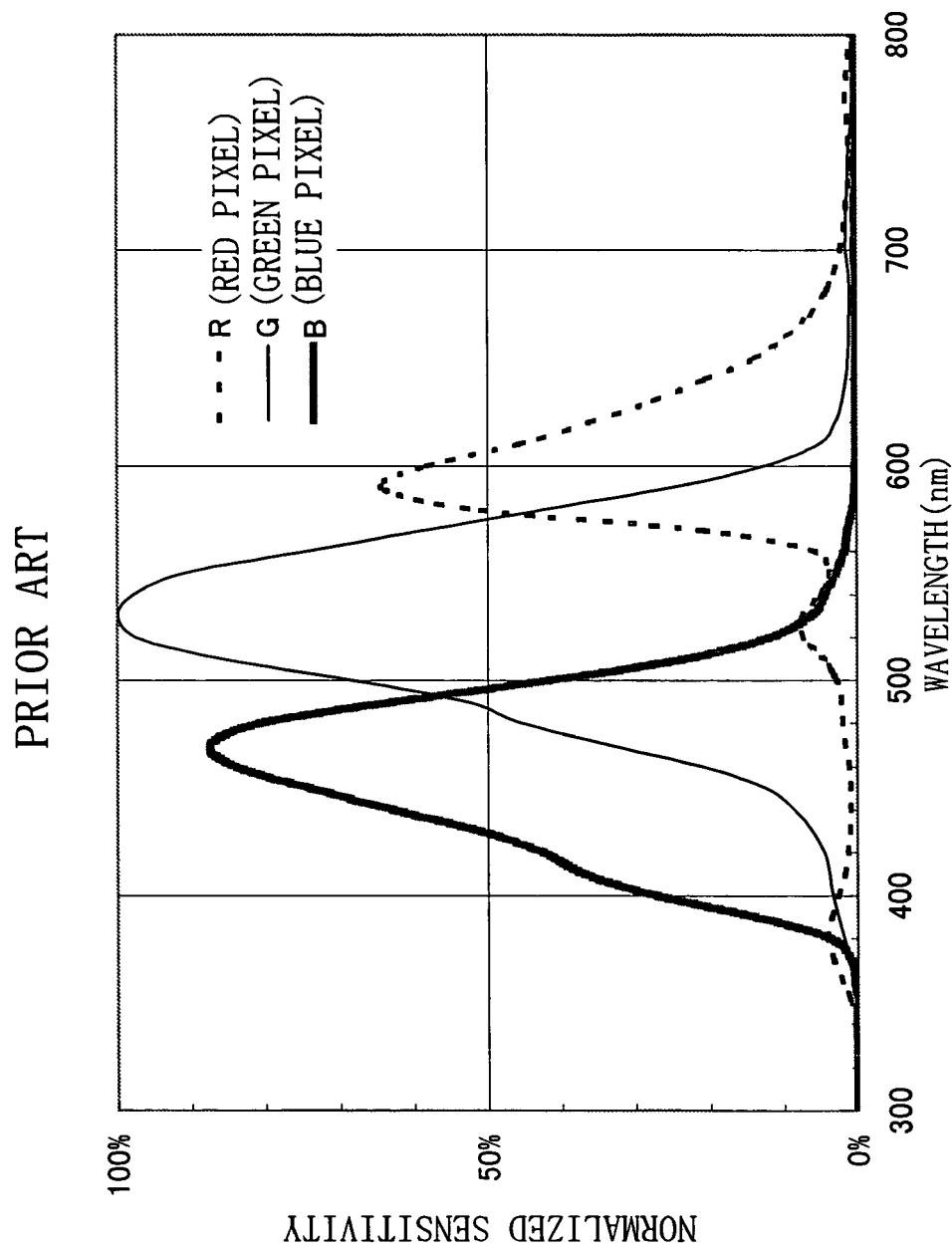
FIG. 1 is a diagram showing an example of a spectral sensitivity characteristic of a conventional image sensor which is normalized on the basis of the peak value of the sensitivity of green pixels.

Furthermore, since the spectral sensitivity of the red pixels is enhanced as shown in FIG. 4, the overlap rate of the spectral sensitivity of the red pixels with the spectral sensitivity of the green pixels is smaller than that of the conventional color photographing device as shown in FIG. 1. Accordingly, the red pixel signal R and the green pixel signal G can be easily separated. As a result, when the pixel signals are converted from R, G and B to Y, Cb and Cr in the color processing unit 66, the noise of Cr which substantially corresponds to the difference between G and R can be reduced.

Supplemental Matter of Embodiment

[1] In this embodiment, when the color temperature Tc is equal to 5000K, Wr is equal to 1.2 (the ratio of the red pixel signal R and the green pixel signal G under achromatic color photographing is 0.83:1) as shown in FIG. 6(a). The present invention is not limited to this embodiment.

When the signal level of the green pixel signal when achromatic color illuminated by a light source having color temperature of 5000K is photographed is set as the standard (100%), the signal level of the red pixel signal R under the same photographing condition is preferably in the range from not less than 60% to not more than 100%. The term "substantially" of "substantially equalizing a signal level of the red pixel and the signal level of the green pixel to each other" in the claims correspond, for example, to the rate ranging from not less than 60% to not more than 100%.

In order to fix Wg to 1 in the range of 6600K>Tc>4200K so that Wr and Wb are kept at 1 or more, the above rate is preferably set in the range from not less than 70% to not more than 90%, and more preferably it is set to about 80%.

Describing conceptually, "substantially equalizing a signal level of the red pixel and the signal level of the green pixel to each other" in the claims means that the signal level of R under the above photographing condition is set as close as possible to the signal level of G, under the condition that the Wr and Wb are kept at 1 or more in the desired color temperature range containing 5000K.

Furthermore, "solar light source in the daytime" in the claims means a light source of about 4400K to 5500K in color temperature (for example, a light source of 5000K in color temperature).

[2] In the above embodiment, when the color temperature Tc is equal to 5000K, Wb is equal to 1.2 (the ratio of the blue and green pixel signals B and G under achromatic color photographing is equal to 0.84:1) as shown in FIG. 6(a). However, the present invention is not limited to this embodiment.

When the signal level of the green pixel signal G when achromatic color illuminated by a light source of 5000K in color temperature is photographed is set as a standard (100%), it is preferable that the signal level of the blue pixel signal B under the same photographing condition is in the range from not less than 60% to not more than 100%. The term "substantially" of "the signal levels of the green and blue pixel signals are substantially equalized to each other" mentioned in the claims corresponds, for example, to the rate ranging from not less than 60% to not more than 100%.

In order to fix Wg to 1 in the range of 6600K>Tc>4200K so that Wr and Wb are kept at 1 or more, the above rate is preferably set in the range from not less than 70% to not more than 90%, and more preferably it is set to about 80%.

Describing conceptually, "the signal levels of the green and blue pixel signals are substantially equalized to each other" mentioned in the claims means that the signal level of B under the above photographing condition is set as close as possible to the signal level of G, under the condition that Wr and Wb are kept at 1 or more in a desired color temperature range containing 5000K.

[3] In the above embodiment, the color photographing device 10 is configured as an electronic camera. The present invention is not limited to this embodiment. For example, only the image sensor 42 may correspond to the light-receiving section and the color photographing device of the claims. In this case, when the output signal of the image sensor 42 is subjected to white balance adjustment, Wr and Wb at color temperature of about 5000K can be decreased.

[4] In the above embodiment, the present invention in all of the claims is applied to an electronic camera. This is because if Wr and Wb at about 5000K are merely decreased, the follow-up range of the white balance is narrowed. The present invention is not limited to this embodiment.

Only the configuration (the white balance adjusting section and the exposure adjusting section only) added to attain the second object of the present invention may be applied to a conventional device. In this case, a color temperature in which white balance can be followed up can be broadened.

A further preferable mode to attain the second object, that is, that "the white balance adjusting section amplifies the green pixel signal in accordance with amount of exposure reduced by the exposure adjusting section, to compensate for the reduced amount of exposure" is executed, however, it does not have to be executed.

In this case, for example, the image data before the image processing is carried out (i.e., image data immediately after being output from the analog-to-digital conversion unit 46) are recorded in the memory card 82. Then, the image data are read from the memory card 82 into a personal computer or the like and are subjected to white balance adjustment. When this adjustment is carried out, the white balance can be properly adjusted by "amplifying the green pixel signal in accordance with the amount of exposure reduced (that is, the white balance gain Wg is increased to more than 1)".

In such a case, information indicating the degree of reduction in the amount of exposure determined in step S1 during photographing, the estimated color temperature Tc, etc. are preferably recorded as appended information together with the image data. This is because these pieces of information can be referred to when the white balance of the image data is adjusted.

[5] In the exposure setting modes 2 and 3, the electronic camera changes the photographing condition to reduce the exposure amount. The present invention is not limited to this embodiment. For example, when photographing is carried out by using an electronic flash device whose photographing mode is set to a TTL auto flash mode, the respective parts may be operated as follows.

First, when an object is illuminated by preflash of the electronic flash device, the color temperature Tc of the light source is estimated by the colorimetry unit 22, and the luminance of the object is measured by the photometry unit 18. After the preflash is stopped, the MPU 30 determines a main flash amount Z on the basis of the object luminance and the set photographing condition (f-number, exposure time, sensitivity).

Subsequently, the white balance adjusting unit 54 is set to any one of the white balance modes 1 to 4 in accordance with the color temperature Tc as in the case of the above-described embodiment. At the same time, when the color temperature Tc is set to any one of the exposure setting modes 2 and 3, an amount calculated by multiplying the main flash amount Z determined previously by a correction coefficient Kd (0.6 or 0.8 in this embodiment) is set as a corrected main flash amount Z'. The other factors of the photographing condition do not require correcting. The MPU 30 instructs the electronic flash device so that light emission is carried out with the corrected main flash amount Z'.

After the photographing is finished, the white balance of the image data generated may be adjusted on the basis of the set white balance mode.

A user may be allowed to input the color temperature of the light source of the electronic flash device. Alternatively, the electronic camera may be configured to obtain the color temperature of the light source from the electronic flash device. The electronic flash device may be installed in the electronic camera or externally equipped to the electronic camera.

Furthermore, the color temperature of the light source (xenon tube or the like) of the electronic flash device is generally estimated to be about 5000K. Accordingly, it is expected that the irradiation amount be not reduced when the exposure setting mode is set to 2 or 3. However, the present invention is effective in a case that the color temperature is greatly varied from about 5000K under bounce flash photography.

The invention is not limited to the above embodiments and various modifications may be made without departing from the spirit and scope of the invention. Any improvement may be made in part or all of the components.

What is claimed is:

1. A color photographing device that has a light-receiving section having a green pixel selectively receiving green light and outputting a green pixel signal corresponding to a light amount received, and a pixel selectively receiving a light with a color different from the green light and outputting an other pixel signal corresponding to an other light amount received, comprising:

a colorimetry unit estimating color temperature of a photography light source;

a white balance adjusting section adjusting white balance of the signals output from the light-receiving section by multiplying a white balance gain to each of the green pixel signal and the other pixel signal of the signals being output; and an exposure adjusting section configuring a setting so as to increase a white balance gain that is multiplied to the green pixel signal when the estimated color temperature is at a color temperature of when the signal level of the green pixel signal is lower than the signal level of the other pixel signal at the time of photographing achromatic color, the achromatic color being illuminated by the photography light source of the color temperature, and setting an amount of exposure at the light-receiving section to a value lower than a proper exposure amount by an amount corresponding to an increment of the white balance gain multiplied to the green pixel signal.

2. The color photographing device according to claim 1, comprising:

an optical filter substantially equalizing a signal level of the green pixel signal and the signal level of the other pixel signal to each other when photographing achromatic color illuminated by a solar light source in daytime, said optical filter being equipped on a side with a light-receiving surface of the light-receiving section.

3. The color photographing device according to claim 2, wherein the other pixel of the light-receiving section has a blue pixel selectively receiving blue light and outputting a blue pixel signal corresponding to a light amount received and a red pixel selectively receiving red light and outputting a red pixel signal corresponding to a light amount received; and the optical filter substantially equalizes the signal levels of the red pixel signal, the green pixel signal, and the blue pixel signal to one another when photographing the achromatic color illuminated by the solar light source in the daytime.

4. The color photographing device according to claim 3, wherein the optical filter has an infrared light cut-off filter, and wherein the infrared light cut-off filter has a transmissivity of 45% or more at a wavelength of 650 nm and a transmissivity of 5% or less at a wavelength of 700 nm.

* * * * *

UNITED STATES PATENT AND TRADEMARK OFFICE
CERTIFICATE OF CORRECTION

PATENT NO. : 7,656,458 B2
APPLICATION NO. : 10/876566
DATED : February 2, 2010
INVENTOR(S) : Hideo Hoshuyama Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1275 days.

Signed and Sealed this

Twenty-eighth Day of December, 2010

David J. Kappos
*Director of the United States Patent and Trademark Office*